United States Patent [19]

Sherwood

[11] 3,870,319

[45] Mar. 11, 1975

[54] DICTATING AND PLAYBACK APPARATUS

[75] Inventor: Henry A. Sherwood, Short Hills, N.J.

[73] Assignor: Lorraine Industries, Inc., Bridgeport, Conn.

[22] Filed: Nov. 21, 1969

[21] Appl. No.: 878,800

[52] U.S. Cl. .............................................. 274/13R

[51] Int. Cl. .............................................. G11b 17/06

[58] Field of Search .................... 274/1 R, 13, 14, 15

[56] References Cited

UNITED STATES PATENTS

| | | | |
|---|---|---|---|
| 2,325,708 | 8/1943 | Runge | 274/14 |
| 2,382,607 | 8/1945 | Clausen | 274/9 X |
| 2,858,135 | 10/1958 | Sherwood | 274/13 |
| 2,939,712 | 6/1960 | Vegliante et al. | 274/9 |

*Primary Examiner*—Harry N. Haroian
*Attorney, Agent, or Firm*—Arthur A. March

[57] ABSTRACT

A combination dictating and playback apparatus having a single transducer and tone arm, cooperable with a pregrooved disc, with means to automatically switch from recording condition to playback condition upon disengaging the transducer from the disc, and for controllably changing from playback condition to recording condition while maintaining the transducer in contact with the recording medium.

13 Claims, 4 Drawing Figures

DICTATING AND PLAYBACK APPARATUS

FIELD OF THE INVENTION

This invention relates to combined recording and playback apparatus having a single transducer for both the recording and playback functions and particularly to such apparatus utilizing pregrooved discs for the recording medium and comprising automatically operated means to switch from the recording condition to the playback condition and controllable means to change from the playback condition to the recording condition while maintaining the transducer in contact with the disc.

BACKGROUND OF THE INVENTION

In making records and particularly in making the type of records used for dictation, it is frequently desirable to be able to play back what has been said before, particularly if there has been an interruption of substantial duration. Even if there has been no outside interruption, a change of thought on the part of the person dictating frequently makes it desirable to re-play the last sentence or two of the subject matter dictated so that the thought can be rephrased in a subsequent area on the dictating medium. When this is done, it is desirable that the subsequent area of the dictating medium be contiguous with the area on which the preceding message was recorded. In the case of a disc record, it is desirable that the subsequent message be recorded on the channel of the same groove that was played back; otherwise when the message on the disc is transcribed there will be a jump in the operation of the playback transducer or a significant interval of time may elapse between one portion of the information and the next portion if the playback needle is required to traverse several grooves between the two portions of the message.

In accordance with one aspect of the present invention means are provided whereby a single needle and transducer is used for both recording and play back and switch means are also provided to change the operation of the apparatus from the recording function to the playback function when the transducer is removed from contact with the pregrooved disc on which the information is being recorded. Means are also provided to actuate the switch means in the reverse sense at will to return the apparatus from the play back condition to the recording condition. This may be done after the last recorded portion of the disc has been played back and while the single needle that serves both playback and recording functions is still in contact with the last portion of the groove on which a message has been recorded.

BRIEF DESCRIPTION OF THE INVENTION

The invention comprises a structure including a disc, turntable and a motor drive therefor together with a single transducer pivotally mounted to traverse a pregrooved disc. The apparatus includes an amplifier which can serve either as a playback amplifier or as a recording amplifier, although in one of these conditions or the other additional amplification may be needed. A switch is arranged adjacent to the tone arm with means to actuate the switch automatically upon removal of the tone arm from engagement with the disc when it is desired to change from the recording condition to the playback condition. The tone arm can then be replaced on the disc at any point, such as the last few grooves on which a message has been embossed and when the apparatus is actuated to rotate the disc, the transducer will serve as a pickup device and will replay the message on those grooves. When the end of that portion of the recorded message is reached, the needle of the transducer can remain in position in contact with the disc and a switch is provided to be actuated to return the amplifier portion of the apparatus to the recording condition so that the immediately-following section of the same groove on which the needle rests can be embossed with a subsequent message without any intervening "dead" space.

The apparatus can be compactly arranged in a two-tier structure that at least partly overlaps the turntable and record, permitting the record to be easily changed and leaving freedom of movement of the tone arm but at the same time effectively locating part of the components over an area of the turntable that need not be reached directly.

BRIEF DESCRIPTION OF THE DRAWINGS

The invention will be further described in connection with the drawings in which.

DETAILED DESCRIPTION OF THE INVENTION

Figure 1:
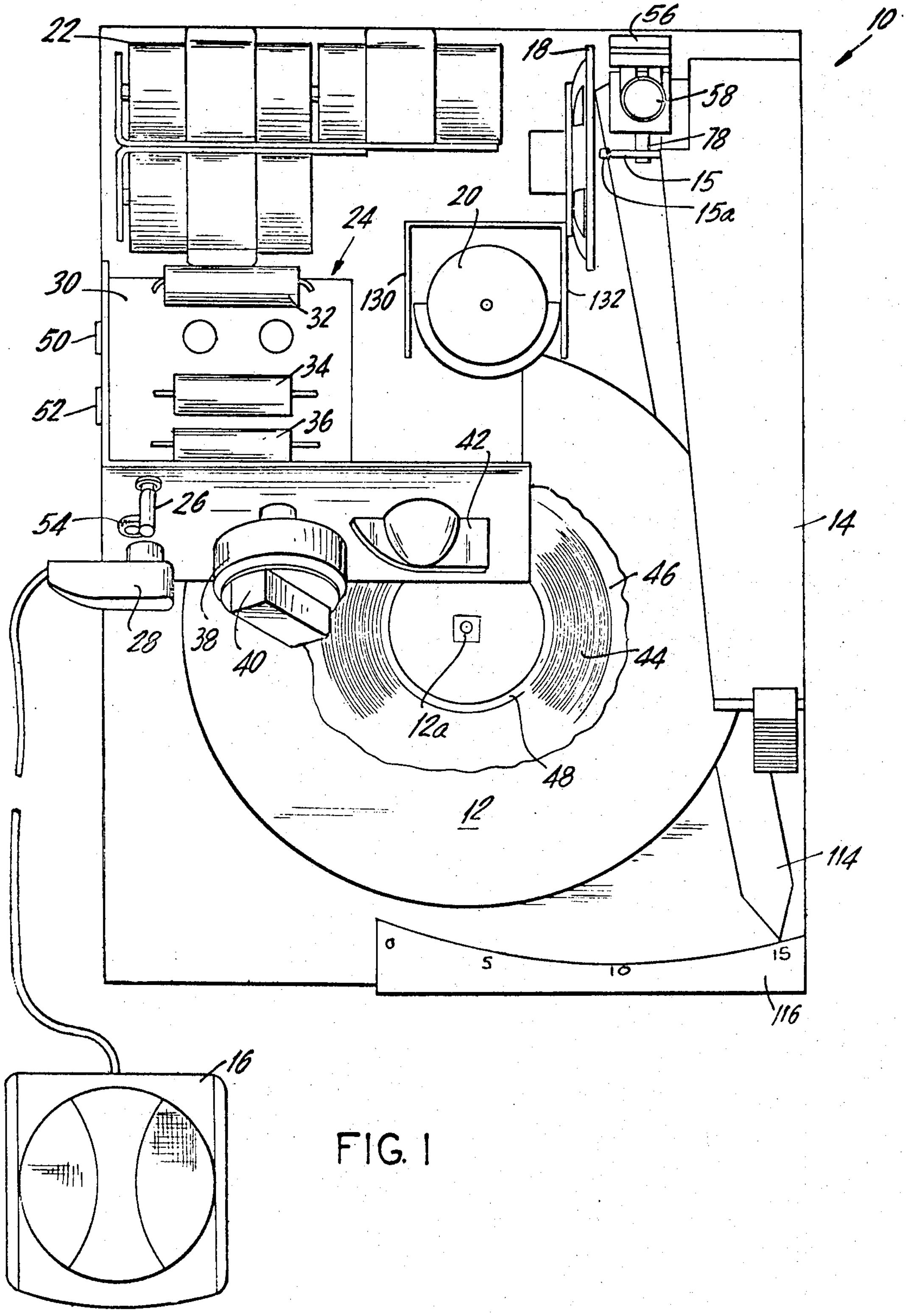
FIG. 1 is a plan view of a combined recording and playback apparatus constructed according to the invention.
Figure 2:
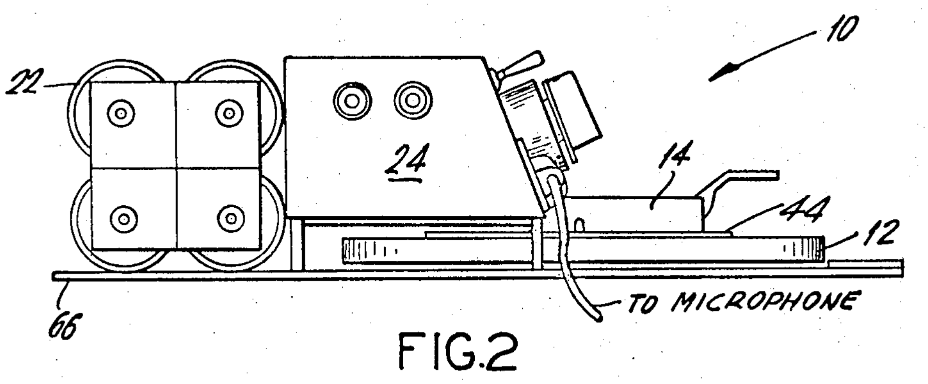
FIG. 2 is a side view of the apparatus of FIG. 1.

The recording and playback apparatus 10 shown in FIG. 1 comprises a turntable 12 having a center 12*a* and a single tone arm 14 mounted alongside the turntable and in position to move pivotally over it. The tone arm has a pin 15 extending from one side of it with a knob 15*a* at the end of the pin. Attached to the apparatus 10 and electrically a part thereof is a microphone 16 connected to the apparatus by a flexible lead. A loudspeaker 18 is mounted directly on the apparatus 10 along with a motor 20 that drives the turntable 12. The motor is driven by a battery power supply 22 which also serves to energize recording and playback amplifiers mounted on a panel 24. A main switch 26 controls the current from the power supply 22 to disengage the batteries from any load when it is desired to have the apparatus 10 inoperative.

The panel 24 includes electronic components that make up an amplifier for both recording and playback purposes, although it is possible that additional amplification, such as a pre-amplifier or an additional power amplifier, might be used for one or the other of the two conditions of operation. The amplifier need not be described in detail; several of its components are shown in FIG. 1 including three capacitors 32, 34 and 36. The controls to operate the apparatus 10 include a volume control 38 and a tone control 40 mounted concentrically therewith. A speed control 42 is mounted alongside the latter controls and serves to control the rotational speed of the motor 20. Normally the speed control is used to accelerate or decelerate the speed of the record to enable the transcriber to obtain that ratio of speed which will accomplish a proper transcription of the dictated material.

The recording medium is a pregrooved disc 44 having an ungrooved peripheral portion 46 and an ungrooved inner portion 48 with an annular grooved portion therebetween. Recording discs of this type have long been known and are made of a plastic material capable of being embossed to record information thereon by modulating the original spiral groove.

Although the apparatus may be self-contained, provision is made for connecting external pieces of equipment. For example, a jack 50 is provided to connect an auxiliary power supply to the apparatus to supplement or replace the batteries 22. Another jack 52 is provided for external control of the motor 20. A third jack 54 is provided so that an additional loudspeaker may be connected to the apparatus.

Figure 3:
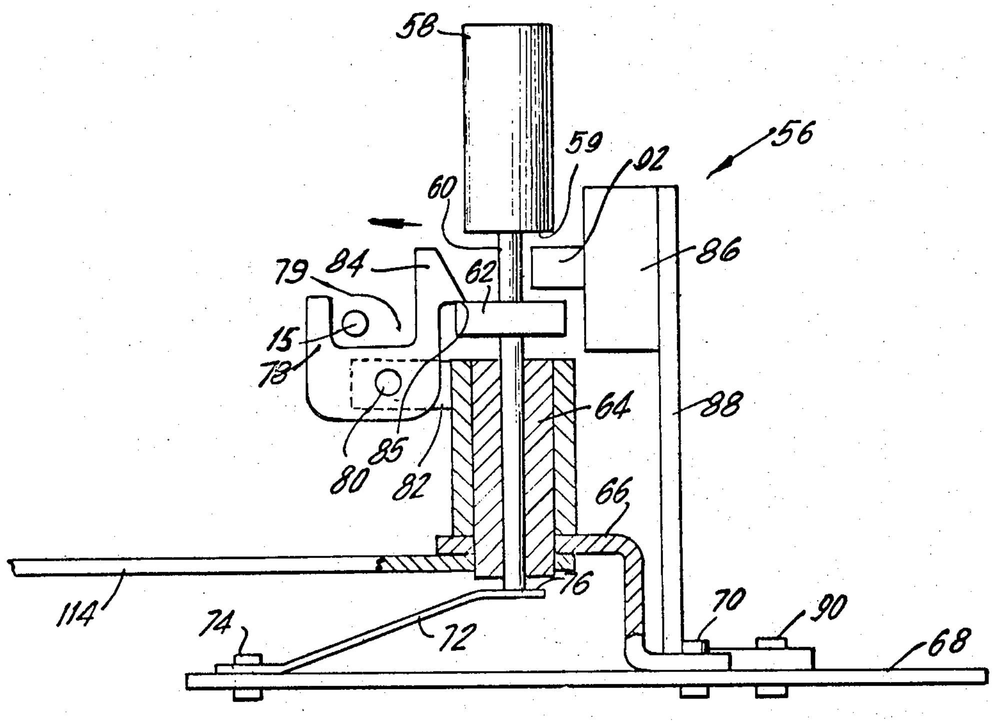
FIG. 3 is an enlarged cross-sectional view of a switching means shown in FIG. 1 and used to set the apparatus for either the recording or the playback condition.

One of the novel aspects of the apparatus includes a switch unit 56 that is shown in both FIG. 1 and FIG. 3. This switch unit is connected to the electronic circuit of the apparatus to change the operation from recording to playback and vice versa. The switch unit is operated by a push button 58 having a lower shoulder 59 (FIG. 3) and a supporting rod 60 on which there is a collar 62. The rod slides in a sleeve 64 and is mounted vertically on the apparatus 10. The sleeve is held by a bracket 66 attached to the housing floor 68 of the apparatus by means of one or more fasteners 70. A leaf spring 72 is also attached to the housing floor 68 by a fastener 74 and presses against the bottom end 76 of the shaft 60. A pivoted, generally U-shaped bracket 78 having a recess 79 is pivotally mounted on a pin 80 held in an extension member 82 of the bracket 66. One leg 84 of the bracket 78 has a catch 85 extending from it to engage the collar 62. A switch 86 is mounted on a bracket 88 adjacent the bracket 66 and is held in place on the housing floor 68 by a fastener 90. The switch 86 has an arm 92 located in such a position as to be actuated by the shoulder 59 when the push button 58 moves downwardly or by the collar 62 when the push button moves back up.

Figure 4:
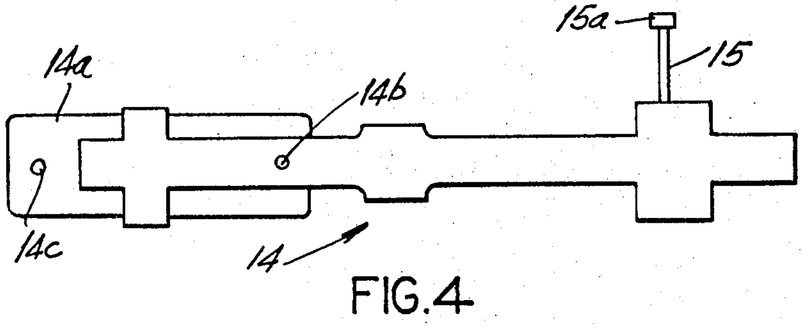
FIG. 4 shows the essential components of the tone arm of FIG. 1.

The underside of the tone arm 14 is shown in FIG. 4 and includes a crystal cartridge transducer 14*a* which can operate either as a recording transducer or as a playback transducer depending upon whether a signal is fed into it or is derived from it. The cartridge 14*a* has an attaching screw 14*b* to connect it to the arm 14 and a needle 14*c* that engages the pregrooved record 44. At the other end of the arm 14 is the pin 15 which has a knob 15*a* at its outer end.

The mechanical operation of the apparatus may be considered to begin with the apparatus in its recording condition. When the tone arm 14 as shown in FIG. 1 is pivotally moved so that the needle 14*c* rests in the grooved part of the record 44, the push button 58 may be depressed to connect the electronic circuit to provide a signal to the transducer in response to sound picked up by the microphone 16. The needle 14c may be allowed to rest against the record 44 with the same pressure no matter whether the apparatus 10 is being used to record a message or to play back a previously recorded message, and this identical pressure simplifies the construction since it makes it unnecessary to provide means to adjust the pressure differently for the two different modes of operation. An indicator 114 is connected to the tone arm 14 to pivot therewith so as to indicate, with respect to the scale 116, the approximate amount of time that has expired since the recording process was begun with respect to a given record.

The pin 15 is so positioned that it is engaged by the bracket 78 when the tone arm 14 is lifted. This movement automatically releases the leg 84 of the bracket 78 from the collar 62 to permit the push button 88 to be released from its recording position to playback position. The pin 15 is located in such manner that it in no way interferes with the movement of the bracket while the needle is riding across the record nor does it interfere with the free motion of the bracket when the push button is energized. It is unnecessary to lift the arm 14 or to move the bracket 78 while the arm is traversing the record and, if desired, an entire record may be embossed in one uninterrupted movement of the arm 14.

However, if the arm 14 is lifted, the pin 15 will also be moved to accomplish the result heretofore described. This permits the spring 72 to push the vertical shaft 60 upwardly, thereby moving the arm 92 of the switch 86 to its upper position by means of engagement between the collar 62 and the arm 92. When this happens, the switching unit 56 will place the apparatus in its playback condition. Then, if the arm 14 is returned to engagement with the record 44, the part that has just been recorded can be played back, whether that part be short or long. The bracket 78 will have no effect on the shaft 60 because the collar 62 will have moved up past the catch 85. Ordinarily, in playing back the last part of a passage that has been dictated, the dictator will wish to resume dictation immediately after playing back the last part of the material just recorded. For this reason it is desirable that the same needle be used for both recording and transcribing, since, in the transcribing mode the needle will have just reached the end of the recorded passage at the very point that the operator wishes to return to the transcribing mode. All the operator needs to do to make this change is to depress the button 58. This causes the shoulder 59 to push the arm 92 down, which causes the switch 86 to move to its alternate position and connect the electronic circuit so that they are set for recording rather than transcription. During this motion of the push button 58, the collar 52 moves past and becomes caught under the bottom of the catch 85. This does not cause the pin 15 or the arm 14 to move because the bracket 78 is free to pivot without disturbing the pin 15 since the pivot axis of the bracket is substantially directly below the center of the bracket. Thereafter a further passage can be recorded on the record 44 without any gap between the previous passage and the new passage.

The change from the recording mode to the playback mode requires that the tone arm 14 be lifted off the record, but this is desirable anyway, since what would be played back would always start at a different, and earlier, location than what had just been recorded. This operation of the switch 86 has the additional advantage that if the tone arm 14 is removed entirely from the record 44 to change records, the apparatus will automatically be returned to the playback mode so that it cannot harm the recording of any passage that was previously recorded on the new record.

It will be understood that the details set forth in the specification are one specific embodiment of the invention and are in no way intended to limit the same, but modifications may be made by those skilled in the art without departing from the spirit of the invention or the scope of the appended claims.

What is claimed is:

1. A combined recording and playback mechanism adapted to be utilized with pregrooved disc records only comprising a tone arm having a single sound transducer for both recording and playback operation, said transducer being provided with a needle that engages the preformed groove in said pregrooved record for embossing during the recording operation and for the transmission of signals during the playback operation, in addition, means for exerting substantially the same pressure on the transducer during both recording and playback operations, means for manually setting the mechanism for recording operation and automatically setting the mechanism for playback operation, and in which the means for automatically setting the mechanism for playback operation are operably actuated by the lifting of the tone arm.

2. A combined recording and playback mechanism adapted to be utilized with pregrooved disc records only comprising a tone arm having a single sound transducer for both recording and playback operation, said transducer being provided with a needle that engages the preformed groove in said pregrooved record for embossing during the recording operation and for the transmission of signals during the playback operation, in addition, means for exerting substantially the same pressure on the transducer and in which the means for manually setting the mechanism for recording operation comprises a push button and switch; including means for locking said push button and switch in recording position and means for releasing said push button and switch upon lifting of the tone arm for playback operation.

3. A combined recording and playback mechanism for pregrooved disc records only, said mechanism comprising a tone arm comprising a single transducer having a single needle that engages the preformed groove in said record for both playback and recording; pivotal mounting means for said tone arm to permit said tone arm to move through an arc parallel to the plane of said record and to permit said tone arm to move through a second arc perpendicular to the plane of said record to disengage said needle from said record; a switch having a recording position and playback position; amplifier means having input and output terminals connected to said switch, said switch also being connected to said transducer to connect said output terminals of said amplifier to said transducer when said switch is in its recording position and to connect said input terminals to said transducer when said switch is in its playback position; actuating means to move said switch from said recording position to said playback position and from said playback position to said recording position; resilient means engaging said actuating means to urge said switch to said playback position; and control means connecting said tone arm to said resilient means to permit said resilient means to actuate said actuating means only when said tone arm is pivoted through said second arc away from said record.

4. A combined recording and playback mechanism for pregrooved disc records, said mechanism comprising a tone arm comprising a single sound transducer for both recording and play back operation, said transducer having a needle that engages said record for both playback and recording; a switch means having a recording position to connect said transducer to a source of recorded signals and a playback position to connect said transducer to means for amplifying signals picked up from said record; means on said arm engaging said switch means to move said switch means into playback position when said needle is removed from engagement with said records; and means to actuate said switch means to said recording position while said needle remains in engagement with said record; said actuating means being resilient and comprising a pushbutton and a support therefor, and said resilient means engaging said support to urge said pushbutton toward an extended position.

5. The mechanism of claim 4 in which said support comprises a shaft and said resilient means engages the end of said shaft.

6. A combined recording and playback mechanism for pregrooved disc records, said mechanism comprising a tone arm comprising a single sound transducer for both recording and playback operation, said transducer having a needle that engages said record for both playback and recording; a switch means having a recording position to connect said transducer to a source of recorded signals and a playback position to connect said transducer to means for amplifying signals picked up from said record; means on said arm engaging said switch means to move said switch means into playback position when said needle is removed from engagement with said records; and means to actuate said switch means to said recording position while said needle remains in engagement with said record; and, in addition, a movable bracket engaging said means to actuate said switch means.

7. The mechanism of claim 6 in which said means to actuate said switch means comprises a push button and a collar thereon, and said movable bracket engages said collar to prevent movement of said collar in one direction as long as said needle remains in engagement with said record.

8. The mechanism of claim 7 in which said bracket is mechanically controlled by said tone arm to move out of the path of said collar only when said tone arm moves away from said record.

9. The mechanism of claim 7 in which said bracket comprises pivotal mounting means.

10. A combined recording and playback mechanism for pregrooved disc records, said mechanism comprising a tone arm comprising a single transducer having a single needle that engages said record for both playback and recording; pivotal mounting means for said tone arm to permit said tone arm to move through an arc parallel to the plane of said record and to permit said tone arm to move through a second arc perpendicular to the plane of said record to disengage said needle from said record; a switch having a recording position and playback position; amplifier means having input and output terminals connected to said switch, said switch also being connected to said transducer to connect said output terminals of said amplifier to said transducer when said switch is in its recording position and to connect said input terminals to said transducer when said switch is in its playback position; actuating means to move said switch from said recording position to said playback position and from said playback position to said recording position; resilient means engaging said actuating means to urge said switch to said play back position; and control means connecting said tone arm to said resilient means to permit said resilient means to actuate said actuating means only when said tone arm is pivoted through said second arc away from said record; said control means comprising a pivotal bracket and a pin extending from said tone arm above said bracket.

11. The mechanism of claim 10 in which said actuating means comprises a member and said bracket comprises a catch that engages said member to restrain movement of said member as long as said pin does not engage said bracket.

12. The mechanism of claim 11 in which said actuating means comprises, in addition, a push button and a support, and said member comprises a collar on said support.

13. The mechanism of claim 12 in which said support is a rod and said actuating means comprises a fixed journal slidably supporting said rod.

* * * * *